United States Patent [19]

Vroomen et al.

[11] Patent Number: 4,898,449

[45] Date of Patent: Feb. 6, 1990

[54] CONNECTOR FOR THE DETACHABLE CONNECTION OF LIGHT CONDUCTING FIBRES

[75] Inventors: Laurentius C. J. Vroomen; Johannes Van Esdonk; Giok D. Khoe; Antonius H. M. Swemmers, all of Eindhoven, Netherlands

[73] Assignee: U.S. Philips Corp., New York, N.Y.

[21] Appl. No.: 313,321

[22] Filed: Feb. 17, 1989

Related U.S. Application Data

[63] Continuation of Ser. No. 81,197, Aug. 4, 1987, abandoned.

[51] Int. Cl.[4] .................................................. G02B 6/38
[52] U.S. Cl. ................................ 350/96.21; 350/96.22
[58] Field of Search ................ 350/96.20, 96.21, 96.22

[56] References Cited

U.S. PATENT DOCUMENTS

| | | | |
|---|---|---|---|
| 3,982,815 | 9/1976 | Nakayama | 350/96.22 |
| 4,140,367 | 2/1979 | Makuch et al. | 350/96.21 X |
| 4,272,154 | 6/1981 | Bachel | 350/96.22 |
| 4,289,374 | 9/1981 | Franken et al. | 350/96.2 |
| 4,341,439 | 7/1982 | Hodge | 350/96.22 |
| 4,405,200 | 9/1983 | Hoffmann et al. | 350/96.21 |
| 4,478,485 | 10/1984 | Khoe et al. | 350/96.20 |
| 4,705,352 | 11/1987 | Margolin et al. | 350/96.2 |
| 4,707,072 | 11/1987 | Kraakman | 350/96.21 |

FOREIGN PATENT DOCUMENTS

| | | |
|---|---|---|
| 0109648 | 5/1984 | European Pat. Off. |
| 3208797 | 3/1982 | Fed. Rep. of Germany |
| 3228921 | 2/1984 | Fed. Rep. of Germany ..... 350/96.2 |
| 54-17860 | 9/1979 | Japan |
| 59-28110 | 2/1984 | Japan |
| 61-28909 | 2/1986 | Japan ................................. 350/96.21 |

Primary Examiner—John D. Lee
Attorney, Agent, or Firm—William L. Botjer

[57] ABSTRACT

The connector comprises two coupling elements (1) in each of which end parts of light conducting fibres (9) are secured mutually in parallel beside each other in such a manner that the centers of their end faces (15) are situated on one line (17) in an end face (19) of the coupling element (1). The connector further comprises a connector housing (25) for receiving the two coupling elements (1). Each coupling element (1) has a cylindrical outer surface (20) the axis of which coincides with the axis of the light conducting core of one of the fibre end parts (9) secured therein (preferably the central one) and which is capable of cooperating with a centring member (27) of the connector housing (25). Each coupling element furthermore has an orientation element (23) which is capable of cooperating with an orientation member (29) of the connector housing (25). As a result of this the cylindrical outer surfaces (20) of the two coupling elements (1) are located with their axes in the elongation of each other and the lines (17) on which the centers of the fibre end faces (15) are located are mutually parallel. As a result of this an optimal coupling between each pair of light conducting fibres (9) is ensured.

5 Claims, 1 Drawing Sheet

CONNECTOR FOR THE DETACHABLE CONNECTION OF LIGHT CONDUCTING FIBRES

This is a continuation of application Ser. No. 081,197 filed Aug. 4,1987, now abandoned.

BACKGROUND OF THE INVENTION

The invention relates to a connector for the detachable connection of pairs of light conducting fibers, comprising two coupling elements in each of which end parts of at least two light conducting fibers are secured beside each other so as to be mutually in parallel in such a manner that the centre of their end faces are situated on one line in an end face of the coupling element, as well as a connector housing for receiving the two coupling elements in such a manner that their end faces engage each other, the coupling elements and the connector housing comprising aligning means to ensure that the end parts of the fibers become located two by two in the elongation of each other.

Such a connector is known, for example, from U.S. Pat. No. 4,272,154. In order to minimise the light losses in the connector it is of importance that the light conducting cores of the end parts of each pair of fibers to be coupled together should become located exactly in the elongation of each other. For this purpose it is necessary for the centres of the end faces of the fibers in each of the coupling elements to be situated on one line with equal mutual distances. A second condition for a low-loss coupling is that the lines on which the centres of the fiber end faces in the two coupling elements are located, become located exactly parallel in the connector housing and that the mutual positions of at least one pair of fiber end parts to be coupled together are good. The positions of the other fiber end parts then are automatically good. In the known connector the light-conducting fibers are situated on a flat surface in the coupling element and their position is determined by grooves in a cover plate placed on said surface. A part of the flat surface not covered by the cover plate and a side face of the cover plate together with two reference faces in the connector housing constitute the aligning means. The grooves and the side faces of the cover plates of two coupling elements to be secured together must be made together in one operation so as to ensure the desired accuracy. It is, therefore, not readily possible to secure together any pair of coupling elements from a store of coupling elements without loss of accuracy. Consequently, the known connector is not so suitable for use in large numbers.

SUMMARY OF THE INVENTION

It is an object of the invention to improve a connector of the type mentioned in the opening paragraph in such a manner that it is possible to manufacture coupling elements independently of each other and to secure any pair of said coupling elements together with a very great accuracy, so that an optimum pairwise coupling between the light conducting fibers is automatically ensured after the two coupling elements have been connected in the connector housing.

For that purpose the connector according to the invention is characterized in that the aligning means consist of the combination of the following measures:

(a) each coupling element comprises a cylindrical outer surface the axis of which coincides with the axis of the light conducting core of one of the fiber end parts secured in said coupling element and which can cooperate with a centring member of the connector housing so as to centre the coupling elements in the connector housing in such a manner that the two cylindrical outer surfaces are situated with their axes in the elongation of each other;

(b) each coupling elements comprises an orientation element which is capable of cooperating with an orientation member of the connector housing so as to orient the coupling elements in the connector housing in such a manner that the lines on which the centres of the fiber end faces are located are mutually parallel.

The cylindrical outer surface constitutes a reference face the position of which is directly determined by the place of the light conducting core of one of the fiber end parts and does not depend, in contrast with the known connector, on the place of the corresponding reference face of another coupling element. When the two coupling elements are connected in the connector housing it is ensured that at least one pair of fibers is coupled optimally. Due to the orientation element and the orientation member it is also ensured that the lines on which the centres of the fiber end faces are located are accurately mutually in parallel so that all fiber pairs are coupled optimally. The two coupling elements are hence oriented with respect to each other in a system of cylinder coordinates, orientations according to the two coordinates being established independently of each other. In the known connector said orientations take place in combination in a system of rectangular coordinates.

A very reliable and simple method to form a cylindrical outer surface the axis of which coincides with the axis of the light conducting core of a fiber end part is described in U.S. Pat. No. 4,289,374. For using this method it is favourable when the axis of the cylindrical outer surface of the coupling element, in the case of an odd number of pairs of fibers to be connected, coincides with the axis of the light conducting core of the central one of the fiber end parts secured in the coupling element and, in the case of an even number, coincides with the axis of the light conducting core of one of the two fiber end parts which are located immediately beside the centre of the row of fiber end parts secured in the coupling element.

A further embodiment of the connector according to the invention is characterized in that the orientation element is formed by a radial projection of the coupling element and the orientation member is formed by an axial slot in a wall of the connector housing. The projection may be provided on a ring which is placed around the coupling element and is rotated until the projection is, for example, accurately perpendicular to the line on which the centres of the fiber end faces are located. In this position the ring may be locked.

BRIEF DESCRIPTION OF THE DRAWINGS

The invention will now be described in greater detail with reference to the drawing, in which.

DETAILED DESCRIPTION OF THE PREFERRED EMBODIMENTS

Figure 1:
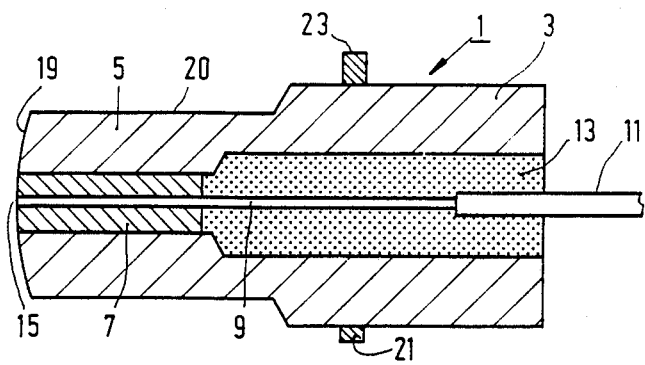
FIG. 1 is a longitudinal sectional view of an embodiment of a coupling element for a connector according to the invention.
Figure 2:
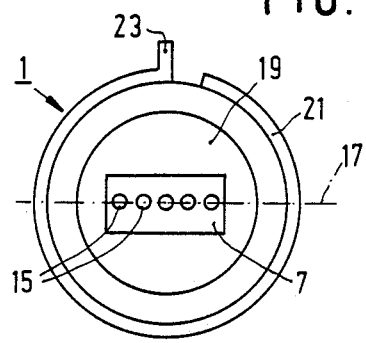
FIG. 2 is an elevation of the end face of the coupling element shown in FIG. 1.
Figure 3:
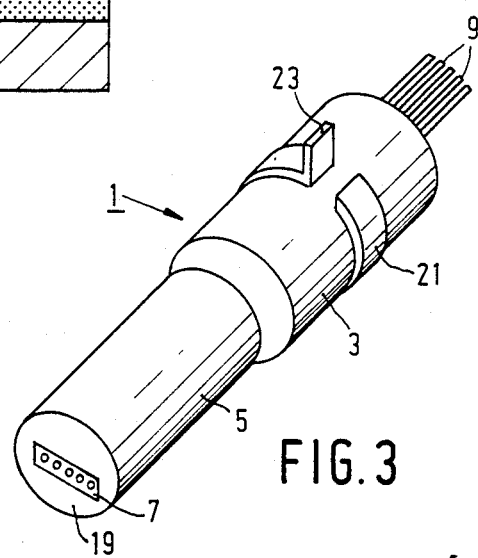
FIG. 3 is a perspective view of the coupling element.

The coupling element 1 shown in FIGS. 1 to 3 comprises an envelope having a rear part 3 and a front part 5. These two parts are cylindrical and the diameter of the front part 5 is smaller than that of the rear part 3. A fiber holder 7 in which end parts of, for example, five light conductor fibers 9 are placed parallel beside each other is connected in the front part 5. The fiber holder 7 has substantially the shape of a rectangular parallelepiped which consists of two plates which are placed against each other and of which at least one comprises parallel grooves for receiving the end parts of the fibers 9 the protective synthetic resin layer 11 of which has been removed. Examples of such fiber holders are described, for example, in EP-A-No. 0,109,648 and the prior Netherlands Patent Application No. 8503409. The fiber holder 7 with the end parts of the fibers 9 connected therein has been inserted, for example, from the rear side (on the right in FIG. 1) into the envelope 3, 5 and is bonded there. The rear part 3 of the envelope through which the fibers 9 extend to the exterior is filled with a moulding mass 13 of a suitable synthetic resin. The light conducting fibers 9 on their front side (on the left in FIG. 1) have end faces 15 the centres of which are situated on a straight line 17 (see FIG. 2) in the end face 19 of the coupling element 1. The end faces 15 together with said end face are polished in such a manner that the assembly has the form of a cylindrical surface with a comparatively large radius of curvature the axis of which is parallel to the line 17. The cylindrical outer surface 20 of the front part 5 of the envelope of the coupling element 1 has then been finished, for example, according to the method described in U.S. Pat. No. 4,289,374 so that the axis of said cylindrical surface coincides accurately with the axis of the light conductive core of the central one of the five fiber end parts. If the number of fiber end parts should be even (for example, four or six) there is no central fiber end part. In that case the axis of the cylindrical outer surface 20 is preferably made to coincide with the axis of the light conductive core of one of the two fiber ends which are situated immediately beside the centre of the row of fiber ends.

A ring 21 having a radial projection 23 is placed around the rear part 3 of the envelope of the coupling element 1. Said ring has been rotated so that the projection 23 is perpendicular to the line 17 and has then been fixed on the coupling element, for example, by welding it to the rear part 3, for example, by means of a laser. The projection 23 constitutes an orientation element.

Figure 4:
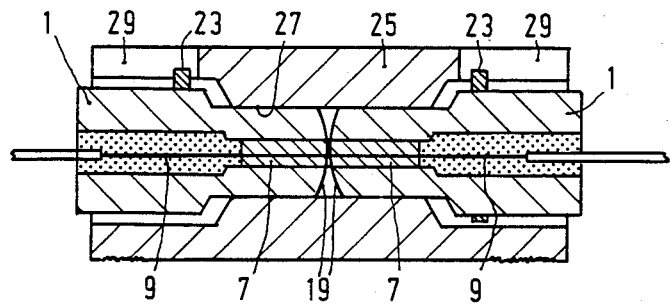
FIG. 4 is a longitudinal sectional view on a reduced scale of an embodiment of a connector according to the invention.
Figure 5:
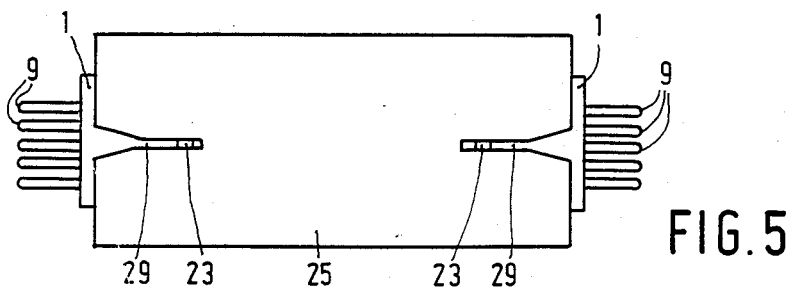
FIG. 5 is a plan view of the connector shown in FIG. 4.

Two coupling elements 1 can be placed in a connector housing 25 with their end faces 19 facing each other (see FIG. 4). The connector housing 25 comprises a centring member 27 which in this example has the form of a hollow cylindrical sleeve in which the front parts 5 of the coupling elements fit accurately so that they become located with their axes in the elongation of each other. Of course it is also possible to provide the connector housing 25 with another centering member, for example a V-shaped groove with pressure means as described in U.S. Pat. No. 4,478,485 or DE-A-No. 3,208,797, a conical clamping sleeve as described in U.S. Pat. No. 3,982,815 or a sleeve having three leaf springs as described in U.S. Pat. No. 4,707,072.

The connector housing 25 furthermore comprises two orientation members in the form of axial slots 29 in the wall of the connector housing. When the coupling elements 1 are inserted into the connector housing 25 the slots 29 guide the projections 23 so that the coupling elements are oriented in the connector housing in such a manner that the lines 17 are accurately mutually parallel. Of course it is also possible to orient the coupling elements 1 in the connector housing 25 in a different manner. For example, the orientation elements on each coupling element 1 may be formed by one or more flat side surfaces at the rear part 3 and the orientation member at the connector housing 25 by corresponding flat surfaces at the interior surface of the parts in which in the example described the slots 29 have been provided.

Due to the aligning means formed by the described centering and orientation means, the axes of each pair of coupled fiber end parts become located accurately in the elongation of each other. Due to the fact that the end faces 19 with the fiber end faces 15 have been polished so as to be slightly cylindrical in the manner described, the fiber end faces are located exactly against each other. All this has for its result that each pair of fibers 9 is coupled together optimally (that is to say with very small light losses, for example 0.5 dB or less).

What is claimed is:

1. A connector for the detachable connection of pairs of light conducting fibers comprising:
   (a) first and second coupling elements, each of said coupling elements including a cylindrical reference surface and an end surface, means for mounting at least two light conducting fibers in a parallel relationship along a line, the longitudinal axis of said cylindrical reference surface being constructed and arranged to coincide with the axis of one of said light conducting fibers;
   (b) an orientation element located on each of said first and second coupling elements, said orientation element being disposed in a predetermined relationship with said light conducting fibers; and
   (c) a connector housing for joining said first and second coupling elements, said housing including first and second cylindrical cavities, said cylindrical cavities closely fitting said cylindrical reference surfaces and receiving said first and second coupling elements with said end surfaces of said first and second coupling elements juxtaposed in proximate end to end relation, said connector having means for cooperative engagement with said orientation element on each of said coupling elements so as to dispose said coupling elements in the connector housing in such a manner so that the lines along which said light conducting fibers are disposed are mutually parallel.

2. The connector as claimed in claim 1 wherein said light conducting fibers comprise an odd number of light conducting fibers and wherein the axis of the cylindrical reference surface of the coupling element coincides with the axis of the light conducting core of the central one of the odd number of light conducting fibers.

3. The connector as claimed in claim 1 wherein said light conducting fibers disposed in a row comprise an even number of fibers and wherein the axis of the cylindrical reference surface of the coupling element coincides with the axis of one of the two fibers disposed immediately beside the center of the row of fibers.

4. The connector as claimed in claim 1 wherein said orientation element is formed by a radial projection disposed on said coupling element and said cooperative engagement means comprises an axial slot in a wall of said connector housing.

5. A connector as claimed in claim 1 wherein the end surface of each coupling element is constructed and arranged in the form of a cylindrical surface, the axis of which is parallel to the line on which the centers of the fibers are located.

* * * * *